(12) United States Patent
Silber et al.

(10) Patent No.: US 6,786,292 B2
(45) Date of Patent: Sep. 7, 2004

(54) ARRANGEMENT AND METHOD FOR FASTENING TO A VEHICLE BODY

(75) Inventors: Kurt Silber, Weinstadt (DE); Hermann Reichling, Cologne (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 17 days.

(21) Appl. No.: 09/966,361

(22) Filed: Oct. 1, 2001

(65) Prior Publication Data

US 2002/0046890 A1 Apr. 25, 2002

(30) Foreign Application Priority Data

Sep. 30, 2000 (DE) ......................................... 100 48 530

(51) Int. Cl.[7] .............................................. F28F 9/007
(52) U.S. Cl. ........................ 180/68.4; 180/68.3; 165/67
(58) Field of Search .............................. 180/68.4, 68.1, 180/68.6, 69.2, 68.3, 68.5; 165/67, 68, 149; 248/209, 213.3, 213.4, 232, 220.21, 217.1, 205.4

(56) References Cited

U.S. PATENT DOCUMENTS

| | | | | |
|---|---|---|---|---|
| 1,737,057 A | * | 11/1929 | Muir | 180/68.4 |
| 1,775,112 A | * | 9/1930 | Yeager | 180/68.4 |
| 1,874,400 A | * | 8/1932 | White | 180/68.4 |
| 5,069,275 A | * | 12/1991 | Suzuki et al. | 165/67 |
| 5,407,161 A | * | 4/1995 | Mulkeran | 248/232 |
| 5,413,190 A | | 5/1995 | Tuteja | |
| 5,429,182 A | * | 7/1995 | Hanafusa | 165/67 |
| 5,628,361 A | * | 5/1997 | Getto | 165/67 |
| 5,915,490 A | * | 6/1999 | Wurfel | 180/68.1 |
| 6,024,333 A | * | 2/2000 | Raasch et al. | 248/247 |
| 6,382,312 B2 | * | 5/2002 | Avequin et al. | 165/140 |
| 6,513,579 B1 | * | 2/2003 | Kent et al. | 165/67 |
| 2001/0019098 A1 | * | 9/2001 | Guyomard | 248/562 |
| 2001/0040021 A1 | * | 11/2001 | Avequin et al. | 165/67 |

FOREIGN PATENT DOCUMENTS

| | | | | |
|---|---|---|---|---|
| DE | 19638309 A1 | 3/1998 | | |
| DE | 19741522 A1 | 3/1999 | | |
| JP | 59-92218 | * 11/1982 | | B60K/11/04 |
| JP | 2-193788 | * 7/1990 | | B62J/39/00 |

* cited by examiner

*Primary Examiner*—Brian L. Johnson
*Assistant Examiner*—J. Allen Shriver
(74) *Attorney, Agent, or Firm*—Crowell & Moring LLP

(57) ABSTRACT

A fastening arrangement is provided for a radiator module. In order to ensure a tight connection between corresponding openings in the vehicle body and in the module, the fastening points are constructed as elongated openings constructed in the same direction.

6 Claims, 4 Drawing Sheets

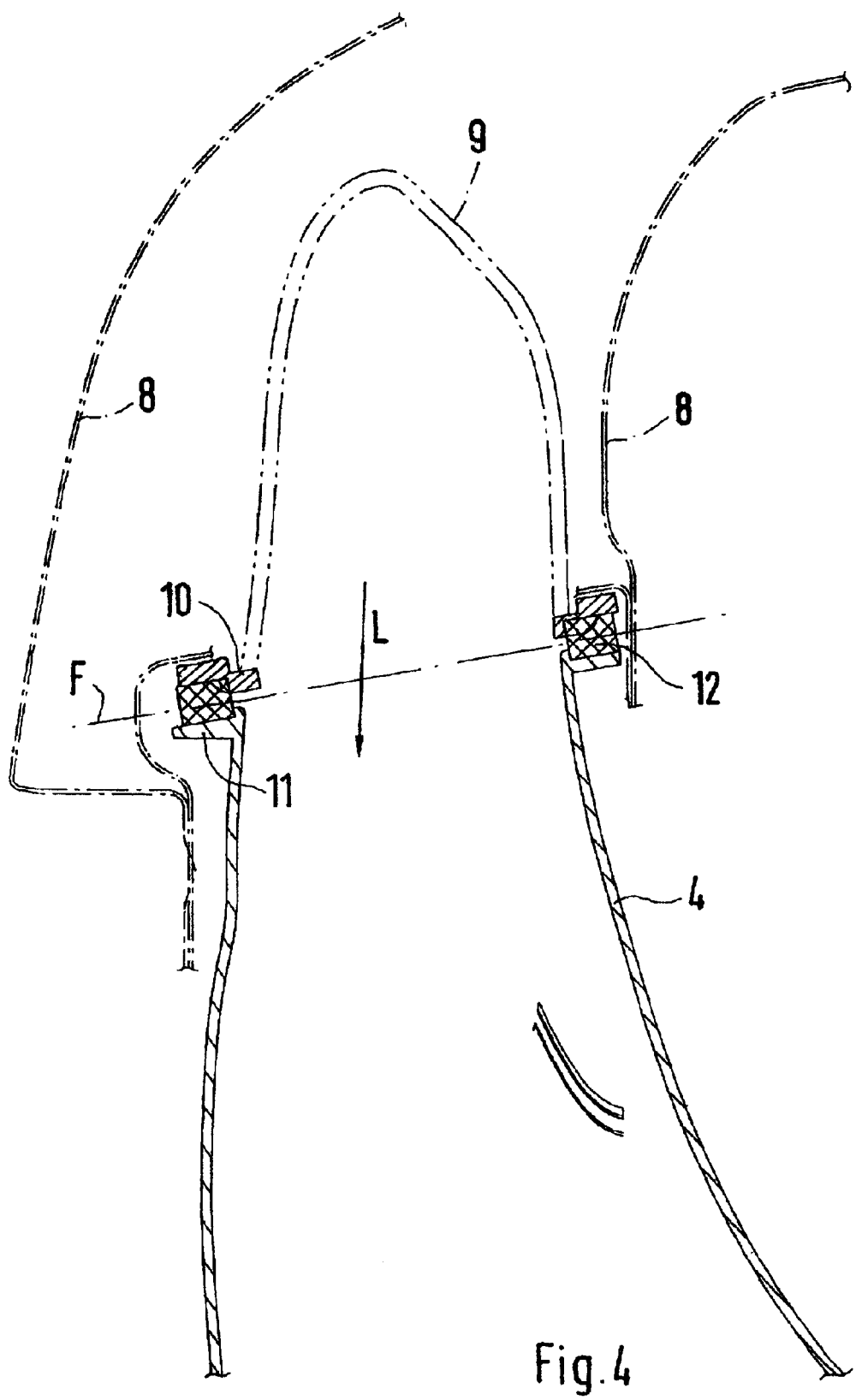

ARRANGEMENT AND METHOD FOR FASTENING TO A VEHICLE BODY

This application claims the priority of German patent application 100 48 530.8, filed Sep. 30, 2000.

BACKGROUND AND SUMMARY OF THE INVENTION

The invention relates to a fastening arrangement for a module for the fastening of the module on a vehicle body. Certain preferred embodiments relate to fastening arrangements for a radiation module.

Modules, which, as a rule, consist of a structural member or of a subassembly and of a console combining the structural members or the subassembly to a module, are mounted on vehicles by means of screwed connections on a body of the vehicle. This type of fastening is reasonable with respect to cost and simultaneously permits a precise positioning of the modules. However, it is a disadvantage that, in the case of unfavorable installation conditions, the fastening points cannot be freely accessible and, as a result, an assembly or a pre-assembly becomes more difficult.

A special mounting situation exists when a passage opening between the vehicle body and the module is not situated in the fastening plane of the module. In this case, tolerances in the module as well as in the vehicle body may have the result that the corresponding openings in the vehicle body and in the module are not situated sufficiently closely upon one another for ensuring a tight connection. Although tolerances can be compensated by correspondingly enlarged receiving openings for the fastening elements on the module carrier, it is a disadvantage in this case that simultaneously the module must now be held in the correct position and the fastening elements must be mounted.

This problem is solved according to preferred embodiments by providing fastening arrangement for a module for the fastening of the module on a vehicle body, wherein fastening points of the module are constructed as a plurality of elongated openings extending in the same direction. According to the invention, it is suggested for a module carrier of the above-mentioned type to construct the fastening points as elongated openings constructed in the same direction. This results in the advantage that, in the case of modules in unfavorable mounting positions, the elongated openings can be aligned such that the module can be moved to its site essentially transversely to the axis of the fastening device, that is, by sliding in a fastening plane. The module must no longer be held for mounting the fastening elements.

Advantageous further developments of the invention are described herein and in the claims.

Thus, it is suggested according to certain preferred embodiments of the invention to construct the elongated openings at least partially as a curved path. As a result of this construction of the elongated openings, the mounting operation can be still better adapted to the local situations. If, for example, as also suggested, the curved path is constructed such that its end area is directed against the gravitational force, the module is secured in its pre-assembly position in which the fastening elements are not yet mounted, against an accidental falling-out because, for a detachment, the module would first have to be lifted against the gravitational force. In the same manner, it is possible to achieve a movement required for the mounting as a result of the curved path. If, for example, a passage opening between the vehicle body and the module is not situated in the mounting plane but in a plane perpendicular thereto, as a result of a corresponding construction of the curved path, a movement can be forced in the course of the mounting operation which guides the module from its starting position to its final mounting site and, shortly before the mounting site has been reached, forces a movement for a joining of corresponding openings in the vehicle body and in the module.

Irrespective of the construction of the elongated openings as curved paths, for further simplifying the assembly, it can be provided to construct at least one of the flanks of at least one elongated opening as an insertion aid. This facilitates particularly the pre-assembly of fastening points which are not directly visible during the mounting operation.

The above-described invention is particularly advantageous if it used in conjunction with a passage opening consisting of corresponding openings in the vehicle body and in the module, in which case these openings are to be sealingly joined onto one another in the course of the mounting operation.

Other objects, advantages and novel features of the present invention will become apparent from the following detailed description of the invention when considered in conjunction with the accompanying drawings.

BRIEF DESCRIPTION OF THE DRAWINGS

FIG. 4 is partial view according to Line IV—IV of FIG. 1.

DETAILED DESCRIPTION OF THE DRAWINGS

Figure 1:
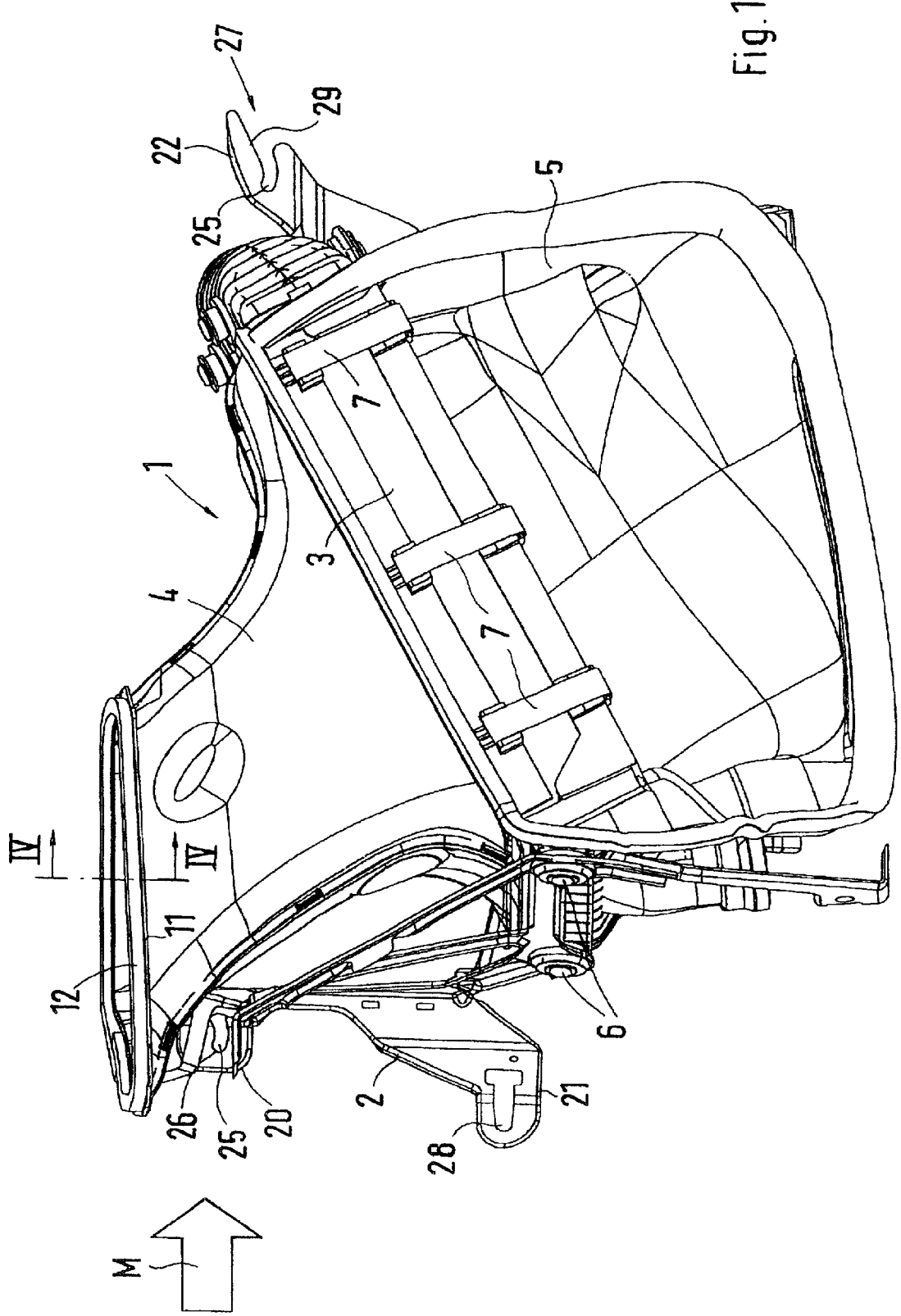
FIG. 1 is a view of a module according to the invention from a plane parallel to the mounting plane.

The module illustrated in FIG. 1, here, a radiator module 1, comprises a module frame 2 in which a radiator 3 as well as two air guiding ducts 4, 5 are held. The radiator 3 is connected by screws 6 directly with the module carrier 2, while the two air guiding elements 4, 5 are held by way of clamps 7 on the radiator 3. In this case, the first air guiding element 4 is arranged upstream and the second air guiding element 5 is arranged downstream of the radiator 3.

In a vertical sectional view, FIG. 4 shows the first air guiding element 4 in its mounted position. In a body 8 of a vehicle, which is not shown in detail, a duct 9 is provided through which an air current flows in the direction of the arrow L into the first air guiding element 4. On the duct 9, a first flange surface 10 is provided which is arranged in a flange plane F parallel to a corresponding second flange surface 11 of the first air guiding element 4. A sealing device 12 is arranged between the flange surfaces 10, 11. The flange surfaces 10, 11 represent corresponding openings in the vehicle body 8 and in the module 1.

Figure 2:
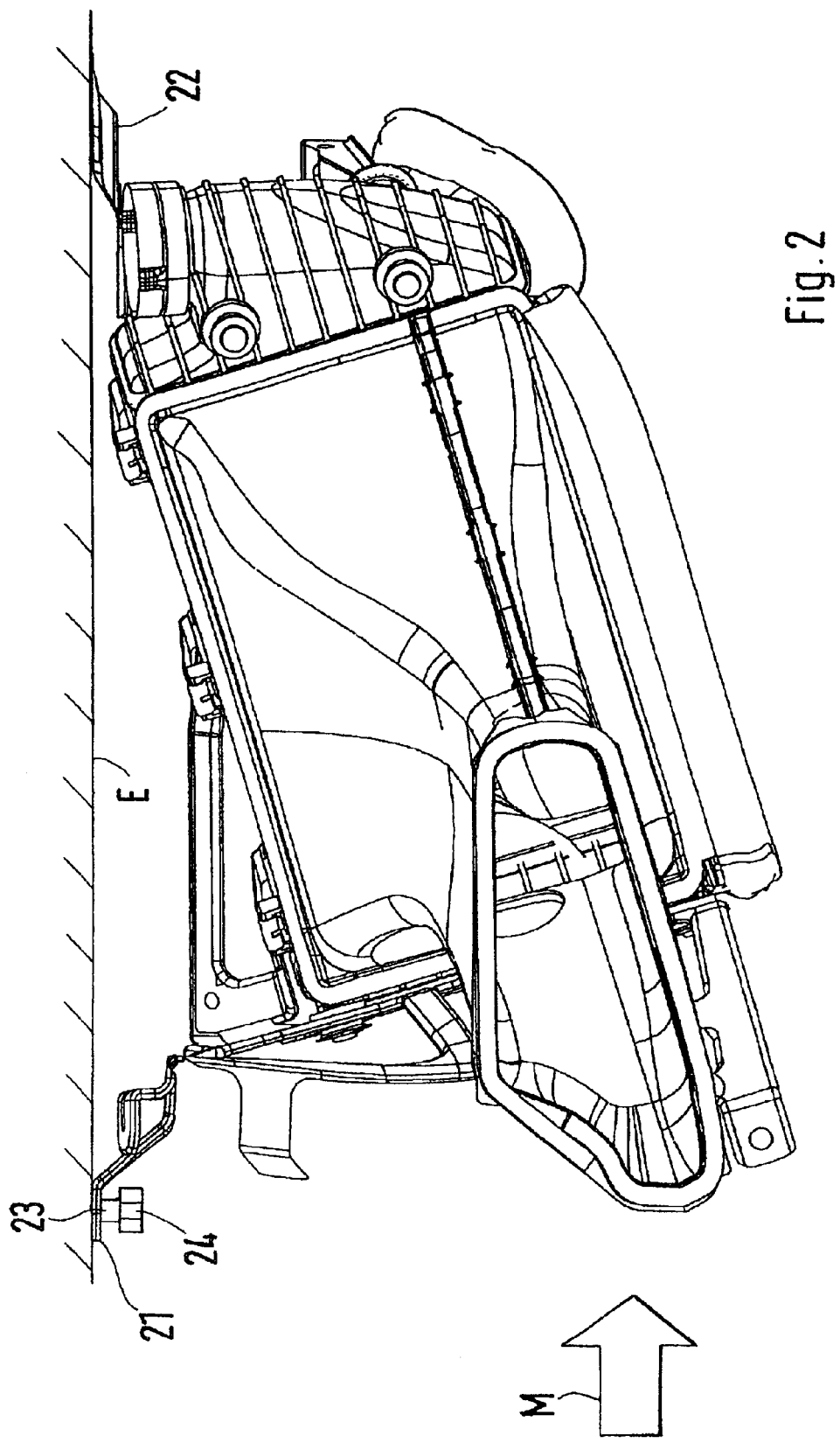
FIG. 2 is a top view of the module.
Figure 3:
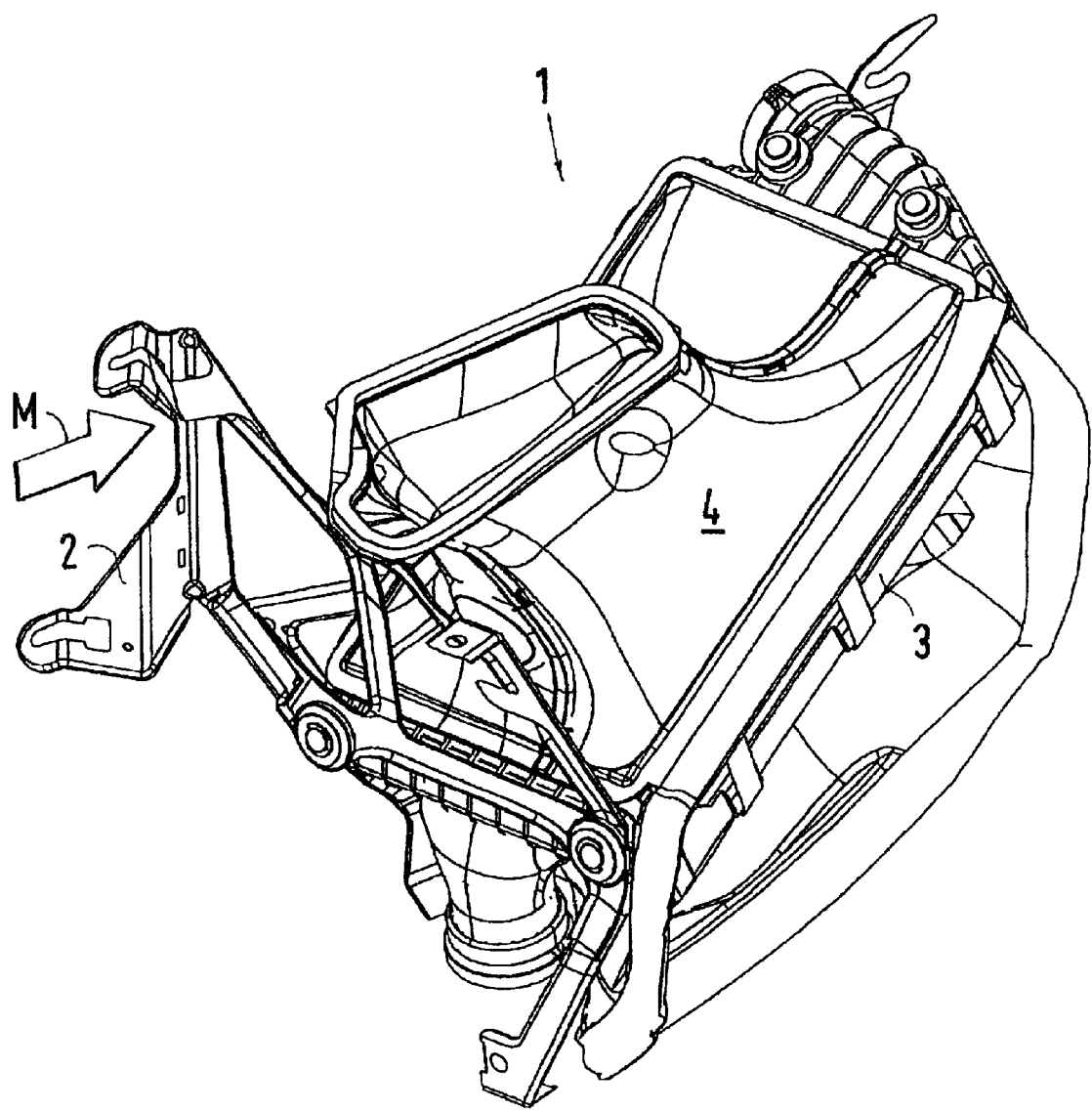
FIG. 3 is a diagonal view of the module.

The mounting direction M of the module 1 is marked by an arrow in FIG. 1. The flange plane F (FIG. 4) is arranged parallel to the mounting direction M but perpendicular to a mounting plane E (FIG. 2).

Fastening points 20, 21 and 22 are provided on the mounting frame 2. The fastening points 20, 21 and 22 are pushed over threaded bolts 23 fastened to the vehicle body 8 by welding and are then fastened by fastening elements, here threaded nuts 24. The threaded bolts 23 are arranged perpendicularly on the mounting plane E and therefore transversely to the mounting direction M.

Elongated openings constructed as curved paths 25 are arranged at the fastening points 20 and 22. An end area 26 of the curved paths 25 is in each case directed upward against the gravitational force. Furthermore, the curved path 25 of the third fastening element 22 is extended in the form of an insertion aid 27 in that a flank 29 of the curved path 25 is lengthened in the manner of a finger and the insertion air 27 as a whole is constructed in the shape of a funnel in order to facilitate the gripping of the assigned threaded bolt 23.

Both curved paths 25 are constructed such that, when the module 1 is moved in the mounting direction M, a movement in the upward direction occurs simultaneously. In the course of this movement, the second flange surface 11 is guided onto the vehicle-body-side first flange surface 10 and the sealing device 12 is slightly prestressed thereby.

In contrast, an elongated opening 28 of the fastening element 21 has a straight construction, in which case the width of the elongated opening 28 is selected to be clearly larger than the diameter of the assigned threaded bolt 23. The fastening point 21 is therefore used exclusively for fixing the module carrier 2 on the mounting plane E and does not contribute to the movement of the module 1 during the mounting operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Fastening arrangement for a module for the fastening of the module on a vehicle body,
    wherein fastening points of the module are constructed as a plurality of elongated openings extending in the same direction;
    wherein at least one of the elongated openings is open laterally and at least one flank of the open elongated opening is constructed as an insertion aid;
    wherein the elongated openings are constructed at least partially as a curved path;
    wherein each elongated opening with a flank constructed as an insertion aid at its open end of its curved path has an opposite end directed upwards into a mounting position of the module against gravitational force; and
    wherein the curved paths are constructed such that a transverse movement of the module is achieved during the mounting operation.

2. A method of fastening a vehicle radiator module to a vehicle using the fastening arrangement of claim 1.

3. A vehicle assembly comprising a vehicle body having a plurality of protruding fastening lugs, and a module including a module frame with a plurality of fastening openings engageable over the fastening lugs,
    wherein said fastening openings are elongated openings extending parallel to one another to facilitate placement of said module with said module frame fastening openings surrounding the respective fastening lugs, and adjusting sliding movement with the module transverse to the fastening lugs to an installation position while supported at the fastening lugs;
    wherein at least one of the elongated curved openings is open laterally to accommodate insertion of the module frame laterally over a corresponding fastening lug; and
    wherein each of the at least one of the elongated openings open laterally is curved with an end area opposite the open end directed upwards so as to secure the module frame and module against gravity when in a preassembled position and during transverse sliding of the module frame to an installation position.

4. A vehicle assembly according to claim 3, wherein said module includes a radiator and air guiding elements held on the module frame.

5. A method of assembling a module on a vehicle body having a plurality of protruding fastening lugs, said method comprising:
    providing said module with a module frame having a plurality of elongated openings,
    placing the module frame with said elongated openings over the respective fastening lugs,
    slidably moving the module frame laterally to an installation position while supported at the fastening lugs, and
    fastening the module frame to the vehicle body with clamping means on said fastening lugs;
    wherein at least one of the elongated curved openings is open laterally to accommodate insertion of the module frame laterally over a corresponding fastening lug; and
    wherein each of the at least one of the elongated openings is curved upwardly at an end area opposite the open end so as to secure the module frame and module against gravity when in a preassembled position and during transverse sliding of the module frame to an installation position.

6. A vehicle assembly according to claim 5, wherein said module includes a radiator and air guiding elements held on the module frame.

* * * * *